United States Patent
Kang et al.

[11] Patent Number: 5,931,377
[45] Date of Patent: Aug. 3, 1999

[54] AIR CONDITIONING SYSTEM FOR A VEHICLE INCORPORATING THEREIN A BLOCK TYPE EXPANSION VALVE

[75] Inventors: Woo Kang; Sang-Hoon Park; Hyoung-Woo Roh, all of Cheonan-shi, Rep. of Korea

[73] Assignee: Korea Automotive Technology Institute, Rep. of Korea

[21] Appl. No.: 08/951,256

[22] Filed: Oct. 16, 1997

[30] Foreign Application Priority Data

Jun. 12, 1997 [KR] Rep. of Korea ................ 97-24249

[51] Int. Cl.$^6$ ................................................. F25B 41/04
[52] U.S. Cl. ...................... 236/92 B; 62/225; 236/99 R
[58] Field of Search ..................... 62/225; 236/92 B, 236/99 R

[56] References Cited

U.S. PATENT DOCUMENTS

| | | | |
|---|---|---|---|
| 2,594,701 | 4/1952 | Wolf | 236/92 B |
| 2,719,674 | 10/1955 | Carter | 236/92 B |
| 3,688,516 | 9/1972 | Newton | 62/225 |
| 3,803,865 | 4/1974 | Newton | 62/225 |

FOREIGN PATENT DOCUMENTS 543951  3/1942  United Kingdom ................ 236/92 B

*Primary Examiner*—William E. Tapolcai
*Attorney, Agent, or Firm*—Anderson, Kill & Olick, P.C.

[57] ABSTRACT

A block type expansion valve for use in a vehicular air conditioning system has a dampening spring to dampen movements of a diaphragm within a diaphragm chamber. The dampening spring is fixed to an upper fixing member positioned on an adjusting hollow thread and a lower fixing members positioned on the diaphragm. The adjusting hollow thread is engaged into a cylindrical thread member to allow a level of biasing force of the dampening spring to be adjusted.

2 Claims, 2 Drawing Sheets

AIR CONDITIONING SYSTEM FOR A VEHICLE INCORPORATING THEREIN A BLOCK TYPE EXPANSION VALVE

FIELD OF THE INVENTION

The present invention relates to an expansion valve for use in an air conditioning system; and, more particularly, to a block type expansion valve for use in an air conditioning system of a vehicle designed to prevent a liquid refrigerant from entering a compressor and to reduce a hunting phenomenon of the air conditioning system.

DESCRIPTION OF THE PRIOR ART

In general, an air conditioning system for use in a vehicle is largely divided into an evaporator, a compressor, a condenser and an expansion valve which are operatively associated with each other in accordance with a normal vapor-compression refrigeration cycle theory. In the vehicular air conditioning system, an externally equalized thermostatic expansion valve is normally used as the expansion valve. In recent years, however, a block type expansion valve has been developed and is gaining acceptance, it being a modification of the externally equalized expansion valve which dispenses with an equalizer port for sensing the pressure and a feeler bulb or thermal bulb for sensing the temperature at the outlet of the evaporator.

In FIG. 1, there is illustrated a block diagram of an air conditioning system built on the vapor-compression refrigeration cycle theory mentioned above, with a block type thermostatic expansion valve employed as an expansion valve.

As shown, the conventional block type thermostatic expansion valve includes a first inlet 12, a first outlet 14, an orifice 19, a passage 16, a temperature-sensing portion 26, a diaphragm 30, a diaphragm chamber 33 and a pressure control chamber 20. The first inlet 12 is prepared at a lower portion of the expansion valve 10, through which a highly pressurized liquid refrigerant contained within the reservoir 400 is introduced to the expansion valve 10. The highly pressurized liquid refrigerant is turned into a low pressurized liquid refrigerant flowing into the evaporator 14 via the first outlet 14 by being throttled and expanded at the orifice 19. The refrigerant is then evaporated in the evaporator 100 prior to entering the passage 16 which communicates with a lower compartment 33b of the diaphragm chamber 33.

In the diaphragm chamber 33 having the diaphragm 30 therein, an upper compartment 33a communicating with the temperature-sensing portion 26 is charged with a fluid in such a way that a predetermined level of pressure is maintained therein. On the diaphragm 30, two kinds of forces are exerted. One is a downward force caused by the fluid charged in the upper compartment 33a and the temperature sensing portion 26; and the other is an upward combined force caused by a spring 24 and the vaporized refrigerant flowing through the passage 16. Depending upon the difference between the upward and the downward forces, the diaphragm 30 is deflected up or down, causing a slider 42, a rod 44 and a ball 22 to be raised to reduce the flow rate of the refrigerant introduced into the orifice 19 or same to be lowered to increase the refrigerant flow rate into the orifice 19.

The conventional block type thermostatic expansion valve constructed in this manner, however, has several shortcomings. First, there may be a possibility of the refrigerant in the liquid state entering the compressor when the expansion valve is operated under a hot ambient temperature. As a result of the fluid contained within the temperature-sensing portion being easily pressurized due to the hot ambient temperature, the diaphragm is additionally deflected down, causing the orifice to remain widely opened for a prolonged time. This allows the refrigerant to be prematurely introduced into the evaporator, prior to being fully expanded at the orifice.

Secondly, in the conventional block type thermostatic expansion valve, it is difficult to prevent the compressor from being subject to a hunting phenomenon which is known to occur at the time when the air conditioning system is initially energized or when the ambient temperature rapidly fluctuates.

Thirdly, as is sometimes done, increasing the level of superheating of the refrigerant in order to lower the temperature of the refrigerant at the evaporator outlet renders the refrigerant to have a higher temperature at the compressor, which in turn causes an unwanted temperature increase within the engine compartment.

SUMMARY OF THE INVENTION

It is, therefore, a primary object of the invention to provide a block type expansion valve resolving those problems mentioned above by using a dampening spring therewithin.

The above and other objects of the invention are accomplished by providing an air conditioning system for use in a vehicle incorporating therein a block type expansion valve provided with a diaphragm chamber for controlling the flow rate of a refrigerant entering an evaporator, the diaphragm chamber divided into an upper compartment charged with a fluid in such a way that a predetermined level of pressure is maintained therein and a lower compartment by a diaphragm biasable up/down to thereby open/close an orifice depending on a difference between forces exerted on an upper and a lower surfaces of the diaphragm, characterized in that said expansion valve comprises: a dampening means positioned within the upper compartment to dampen a biasing movement of the diaphragm.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
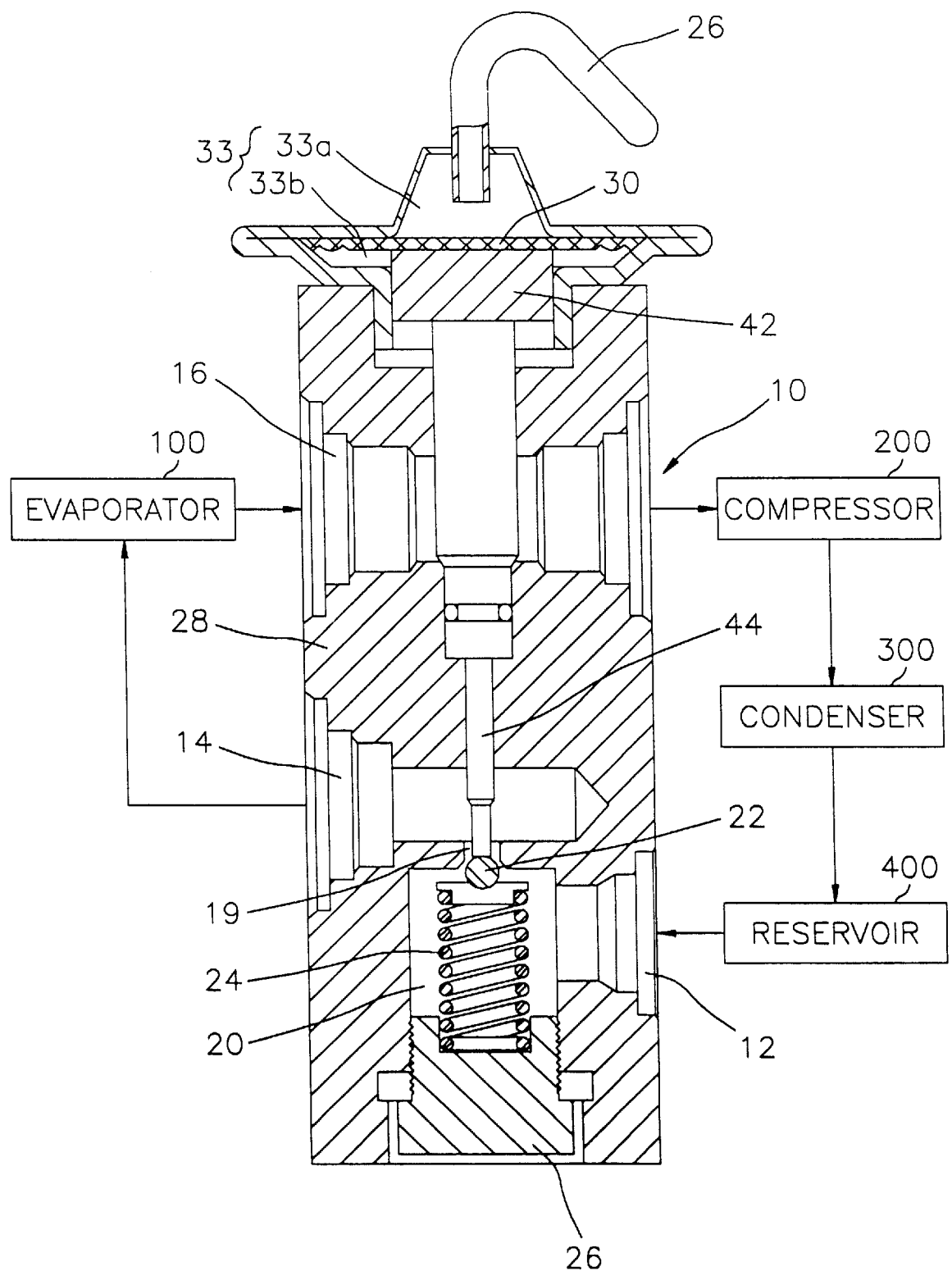
FIG. 1 illustrates a block diagram of an air conditioning system for use in a vehicle, with a conventional block type thermostatic expansion valve employed as an expansion valve.
Figure 2:
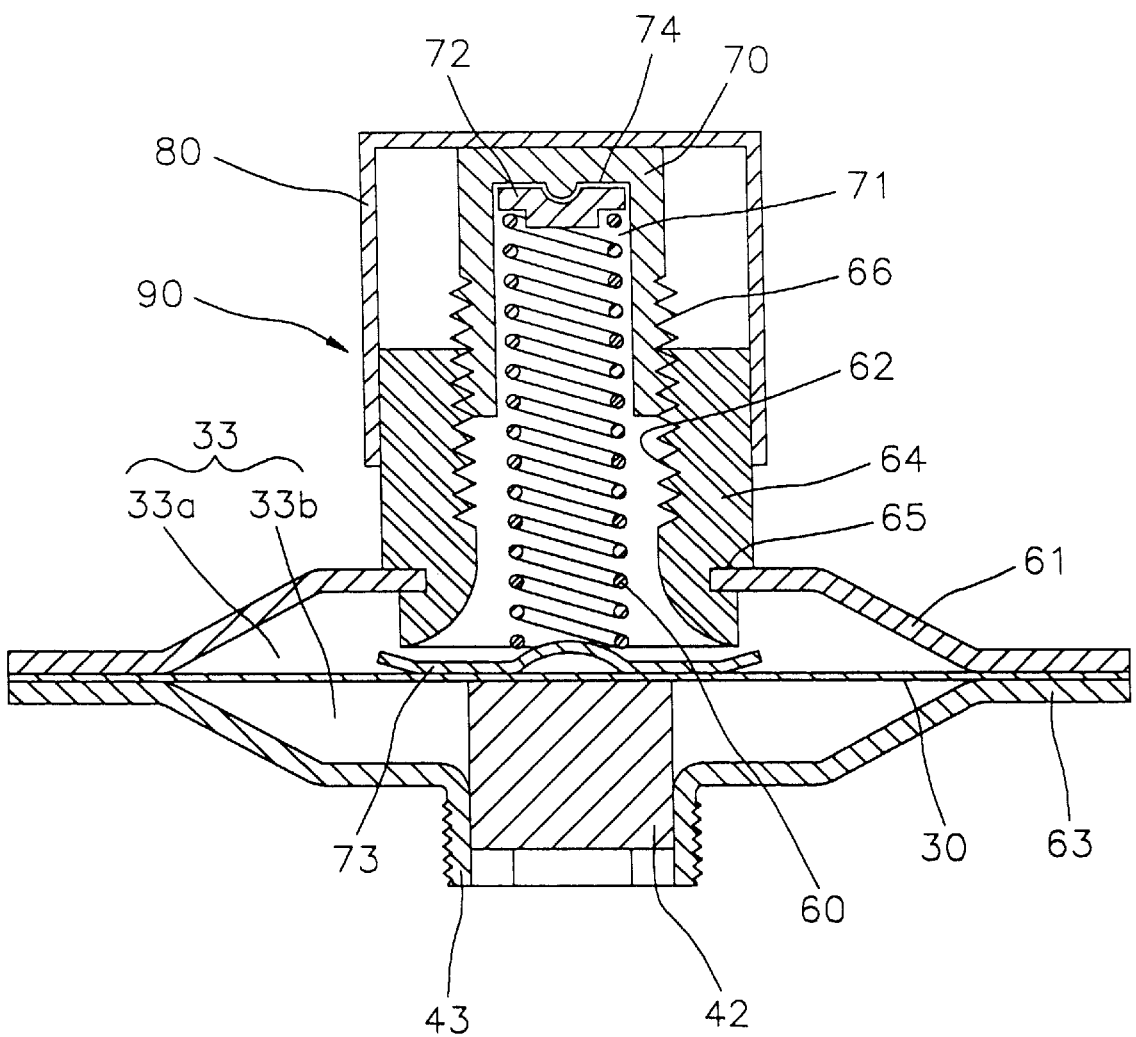
FIG. 2 shows a sectional view of a valve head of a block type expansion valve in accordance with the present invention.

In FIG. 2, there is shown a valve head 90 of a block type expansion valve in accordance with the present invention. Although the main aspects of the inventive expansion valve are shown in FIG. 2, FIG. 1 will be from time to time referenced in describing the present invention. Furthermore, same reference numerals will be used to represent same components in FIGS. 1 and 2. Remainder components of the inventive expansion valve not illustrated in FIG. 2 are identical to corresponding components of the expansion valve as shown in FIG. 1.

In FIG. 2, a diaphragm chamber 33 is divided into an upper compartment 33a and a lower compartment 33b by a diaphragm 30. The upper compartment 33a is defined with an upper surface of the diaphragm 30, an upper frame 61, a cylindrical threaded member 64 and a cap 80. The upper compartment 33a is charged with fluid in such a way that a predetermined level of pressure is maintained therewithin. The cylindrical threaded member 64 is fixed to the upper frame 61 in a sealed relation therewith at its external groove 65. Further, the cylindrical threaded member 64 is closely fitted into the cap 80 at its upper side, leaving the upper compartment 33a in a sealed condition. The cylindrical threaded member 64 has a female thread 62 into which a male thread 66 of an adjusting hollow thread 70 having a blind hole 71 is engaged.

Mounted through a space defined with the female thread 62 together with the blind hole 71 is an adjusting spring 60 which serves to dampen movements of the diaphragm 30. The spring 60 is positioned in place within the space using an upper and a lower fixing members 72 and 73. The upper fixing member 72 is fixed to a top surface 74 of the blind hole 71, with the lower fixing member 73 fixed to the diaphragm 30. Both ends of the adjusting spring 60 are fixed to the upper and the lower fixing members 72 and 73. For an adjustment of a level of a biasing force of the adjusting spring 60, the adjusting hollow thread 70 can be driven into the cylindrical threaded member 64 or can be moved contrary.

In the upper compartment 33a, there is exerted on the upper surface of the diaphragm 30 the biasing force by the adjusting spring 60 together with the pressing force of the fluid contained therein.

On the other hand, the lower compartment 33b is defined by a lower surface of the diaphragm 30 and a lower frame 63. Within the lower compartment 33b, a pressure of refrigerant exhausted from the evaporator 100 as shown in FIG. 1 is exerted on the lower surface of the diaphragm 30 through a guiding neck 43. Further, as shown in FIG. 1, the biasing force caused by the spring 24 is exerted on the lower surface of the diaphragm 30 by way of the rod 44 and the slider 42. These forces exerted on the lower surface of the diaphragm 30 upwardly bias the diaphragm 30.

The adjusting spring 60 used in the present invention has to be initially adjusted to exert a required level of a biasing force to equalize a downward force exerted on the upper surface of the diaphragm 30 with an upward force exerted on the lower surface of the diaphragm 30 by using the adjusting hollow thread 70, wherein the downward force is a combined force with the pressing force of the fluid and the biasing force of the adjusting spring 60; and the upward force is a combined force with the biasing force of the spring 24 and the pressing force of the exhausted refrigerant from the evaporator 100. Further, the adjusting spring 60 is needed to have a resilient coefficient enough to perform the dampening action against the movements of the diaphragm 30. Preferably, a coil spring is used as the adjusting spring 60.

In this configuration, if the pressure of the refrigerant exhausted from the evaporator 100 is lowered, the diaphragm 30 is biased down, making the opening of the orifice 19 larger. As a result, a larger amount of the refrigerant is introduced into the evaporator 100. Further, if the pressure of the refrigerant exhausted from the evaporator 100 is increased, the diaphragm 30 is biased up, making the opening of the orifice 19 smaller, which in turn reduces the flow rate of the refrigerant entering the evaporator 100. During these operations, the adjusting spring 60 serves to resist quick biasing movement of the diaphragm 30, preventing the diaphragm 30 from being subject to an unwanted minute vibration which may cause a hunting phenomenon or the like.

In relation to the shortcomings accompanying the conventional expansion valve, e.g., the hunting phenomenon, the dampening action of the inventive adjusting spring 60 may results in a reduced lasting time of that phenomenon. Further, the dampening of the adjusting spring 60 minimizes the possibility of liquid refrigerant entering the compressor.

Although the invention has been shown and described with respect to the preferred embodiments, it will be understood by those skilled in the art that various changes and modifications may be made without departing from the spirit and scope of the invention as defined in the following claims.

What is claimed is:

1. An air conditioning system for use in a vehicle incorporating therein a block type expansion valve provided with a diaphragm chamber for controlling the flow rate of a refrigerant entering an evaporator, the diaphragm chamber divided into an upper compartment charged with a fluid in such a way that a predetermined level of pressure is maintained therein and a lower compartment by a diaphragm biasable up/down to thereby open/close an orifice depending on a difference between forces exerted on an upper and a lower surfaces of the diaphragm, characterized in that said expansion valve comprises:

a dampening means positioned within the upper compartment to dampen a biasing movement of the diaphragm, the dampening means including a lower fixing member fixed on the upper surface of the diaphragm, a resilient means fixed to the lower fixing member at its one end, a cylindrical threaded member for defining the upper compartment having a female thread through which the resilient means is accommodated, an adjusting hollow thread having a male thread engaged into the female thread and a blind hole within which the resilient means is accommodated, a cap for defining the upper compartment into which the cylindrical threaded member is closely fitted in a sealed manner; and an upper fixing member to which the other end of the resilient means is fixed, the upper fixing member fixed on an inner top surface of the blind hole.

2. The air conditioning system of claim 1, wherein said resilient means is of a coil spring.

* * * * *